United States Patent
Okazawa

(10) Patent No.: US 12,533,658 B2
(45) Date of Patent: Jan. 27, 2026

(54) WATER-ABSORBENT RESIN PARTICLES

(71) Applicant: SUMITOMO SEIKA CHEMICALS CO., LTD., Hyogo (JP)

(72) Inventor: Shiho Okazawa, Himeji (JP)

(73) Assignee: SUMITOMO SEIKA CHEMICALS CO., LTD., Hyogo (JP)

(*) Notice: Subject to any disclaimer, the term of this patent is extended or adjusted under 35 U.S.C. 154(b) by 1065 days.

(21) Appl. No.: 17/604,949

(22) PCT Filed: Apr. 16, 2020

(86) PCT No.: PCT/JP2020/016760
§ 371 (c)(1),
(2) Date: Oct. 19, 2021

(87) PCT Pub. No.: WO2020/218167
PCT Pub. Date: Oct. 29, 2020

(65) Prior Publication Data
US 2022/0219140 A1 Jul. 14, 2022

(30) Foreign Application Priority Data
Apr. 23, 2019 (JP) ................................. 2019-082023

(51) Int. Cl.
*B01J 20/26* (2006.01)
*A61L 15/24* (2006.01)
(Continued)

(52) U.S. Cl.
CPC ............. *B01J 20/267* (2013.01); *A61L 15/24* (2013.01); *B01J 20/28016* (2013.01);
(Continued)

(58) Field of Classification Search
CPC ................................. C08F 8/14; C08F 220/06
See application file for complete search history.

(56) References Cited

U.S. PATENT DOCUMENTS

2016/0367717 A1* 12/2016 Hinayama ............... A61L 15/20
2020/0009528 A1   1/2020 Chiba et al.
2020/0115476 A1   4/2020 Chiba et al.

FOREIGN PATENT DOCUMENTS

CN  105408365  3/2016
CN  105517661  4/2016
(Continued)

OTHER PUBLICATIONS

International Search Report of PCT/JP2020/016760, Jul. 14, 2020, 3 pages.
(Continued)

*Primary Examiner* — Eli D. Strah
(74) *Attorney, Agent, or Firm* — HSML P.C.

(57) ABSTRACT

Water-absorbent resin particles having a gel brightness L* of 8 to 60 measured by a method including the following steps (A), (B), and (C) in this order are disclosed. (A) 0.1 g of water-absorbent resin particles are uniformly scattered in a colorless and transparent round cell for a color-difference meter having an inner diameter of 30 mm. (B) 5.0 g of ion-exchanged water is added to the round cell to cause the water-absorbent resin particles to absorb water. (C) a brightness L* of an obtained gel is measured on a black background after five minutes from the addition of the ion-exchanged water.

8 Claims, 5 Drawing Sheets

(51) Int. Cl.
    *B01J 20/28* (2006.01)
    *C08F 210/16* (2006.01)
    *A61F 13/53* (2006.01)
    *C08F 8/00* (2006.01)
    *C08F 8/14* (2006.01)
    *C08J 3/075* (2006.01)
    *C08J 3/12* (2006.01)
    *C08J 3/24* (2006.01)
    *C08L 33/02* (2006.01)

(52) U.S. Cl.
    CPC .......... *C08F 210/16* (2013.01); *A61F 13/53* (2013.01); *A61F 2013/530481* (2013.01); *A61F 2013/530642* (2013.01); *B01J 20/26* (2013.01); *B01J 20/28011* (2013.01); *B01J 20/2805* (2013.01); *B01J 2220/68* (2013.01); *C08F 8/00* (2013.01); *C08F 8/14* (2013.01); *C08F 2810/20* (2013.01); *C08J 3/075* (2013.01); *C08J 3/12* (2013.01); *C08J 3/24* (2013.01); *C08J 3/245* (2013.01); *C08J 2333/02* (2013.01); *C08L 33/02* (2013.01)

(56) References Cited

FOREIGN PATENT DOCUMENTS

| | | |
|---|---|---|
| CN | 106471013 | 3/2017 |
| EP | 0349240 | 1/1990 |
| EP | 1029886 | 8/2000 |
| EP | 1072630 | 1/2001 |
| EP | 1602671 | 12/2005 |
| EP | 2623198 | 8/2013 |
| EP | 3437732 | 2/2019 |
| EP | 3896106 | 10/2021 |
| EP | 3896115 | 10/2021 |
| EP | 3896116 | 10/2021 |
| EP | 3936225 | 1/2022 |
| EP | 3936530 | 1/2022 |
| EP | 3936533 | 1/2022 |
| EP | 3936536 | 1/2022 |
| EP | 3936537 | 1/2022 |
| EP | 3936538 | 1/2022 |
| EP | 3936540 | 1/2022 |
| EP | 3936549 | 1/2022 |
| JP | H6-293802 | 10/1994 |
| JP | H7-025917 | 1/1995 |
| JP | H7-033804 | 2/1995 |
| JP | H9-157313 | 6/1997 |
| JP | H11-071425 | 3/1999 |
| JP | H11-080248 | 3/1999 |
| JP | H11-349687 | 12/1999 |
| JP | 2003-026706 | 1/2003 |
| JP | 2005-334616 | 12/2005 |
| JP | 2012-012451 | 1/2012 |
| JP | 2012-200429 | 10/2012 |
| JP | 2016-027846 | 2/2016 |
| JP | 2016-028115 | 2/2016 |
| JP | 2016-028118 | 2/2016 |
| JP | 2016-028131 | 2/2016 |
| JP | 2016-121297 | 7/2016 |
| WO | 2016/104374 | 6/2016 |
| WO | 2018/159800 | 9/2018 |
| WO | 2018/159801 | 9/2018 |
| WO | 2018/159802 | 9/2018 |
| WO | 2020/122203 | 6/2020 |
| WO | 2020/184386 | 9/2020 |
| WO | 2020/184388 | 9/2020 |
| WO | 2020/184394 | 9/2020 |

OTHER PUBLICATIONS

International Preliminary Report on Patentability of PCT/JP2020/016760, Nov. 4, 2021, 6 pages.
The extended European Search Report issued for European Patent Application No. 20794449.7, Dec. 6, 2022, 14 pages.
Office Action issued in Japanese Application No. P2021-516063, dated May 14, 2024, 2024, 3 pages.

\* cited by examiner (a)

(b)

WATER-ABSORBENT RESIN PARTICLES

TECHNICAL FIELD

The present invention relates to water-absorbent resin particles.

BACKGROUND ART

A water-absorbent resin is used in the field of sanitary products, and specifically, it is used as a material for an absorber contained in an absorbent article such as a diaper. In production of an absorber, for example, improving absorption efficiency of the absorber by adjusting the properties of pulp has been attempted (for example, Patent Literature 1).

CITATION LIST

Patent Literature

[Patent Literature 1] JP 2012-200429 A

SUMMARY OF INVENTION

Technical Problem

However, there is room for improvement in improving the absorption performance of absorbers. An object of the present invention is to provide water-absorbent resin particles that provide an absorber having a better absorption amount.

Solution to Problem

The inventor of the present invention has found for the first time that, depending on water-absorbent resin particles, there are differences in gel brightness when swollen about 50 times, and when a gel brightness is in a predetermined range, an absorber swelling capacity is better.

Water-absorbent resin particles of the present invention are water-absorbent resin particles having a gel brightness $L^*$ of 8 to 60 measured by a method including the following steps (A), (B), and (C) in this order,
  (A) uniformly scattering 0.1 g of water-absorbent resin particles in a colorless and transparent round cell for a color-difference meter, the round cell having an inner diameter of 30 mm,
  (B) adding 5.0 g of ion-exchanged water to the round cell to cause the water-absorbent resin particles to absorb water, and
  (C) measuring a brightness $L^*$ of an obtained gel on a black background after five minutes from the addition of the ion-exchanged water.

With the above-mentioned water-absorbent resin particles, an absorber having a better absorption amount can be obtained.

In the above-mentioned water-absorbent resin particles, a physiological saline retention amount is preferably 30 to 60 g/g.

The above-mentioned water-absorbent resin particles, a 5-minute value of non-pressurization DW is preferably 30 ml/g or more.

The present invention further provides an absorber containing the above-mentioned water-absorbent resin particles.

The present invention still further provides an absorbent article including the above-mentioned absorber.

The present invention still further provides an absorbent article which is a diaper.

The present invention still further provides a method for producing water-absorbent resin particles, the method including selecting water-absorbent resin particles having a gel brightness $L^*$ of 8 to 60 measured by a method including the following steps (A), (B), and (C) in this order,
  (A) uniformly scattering 0.1 g of water-absorbent resin particles in a colorless and transparent round cell for a color-difference meter, the round cell having an inner diameter of 30 mm,
  (B) adding 5.0 g of ion-exchanged water to the round cell to cause the water-absorbent resin particles to absorb water, and
  (C) measuring a brightness $L^*$ of an obtained gel on a black background after five minutes from the addition of the ion-exchanged water.

An absorber using water-absorbent resin particles obtained by the above-mentioned production method can have a high absorption amount.

The present invention still further provides a method for improving an absorption amount of an absorber containing water-absorbent resin particles, the method including adjusting a gel brightness $L^*$ of the water-absorbent resin particles measured by a method including the following steps (A), (B), and (C) in this order,
  (A) uniformly scattering 0.1 g of water-absorbent resin particles in a colorless and transparent round cell for a color-difference meter, the round cell having an inner diameter of 30 mm,
  (B) adding 5.0 g of ion-exchanged water to the round cell to cause the water-absorbent resin particles to absorb water, and
  (C) measuring a brightness $L^*$ of an obtained gel on a black background after five minutes from the addition of the ion-exchanged water.

Advantageous Effects of Invention

According to the present invention, water-absorbent resin particles that provide an absorber having a better absorption amount are provided.

DESCRIPTION OF EMBODIMENTS

Figure 1:
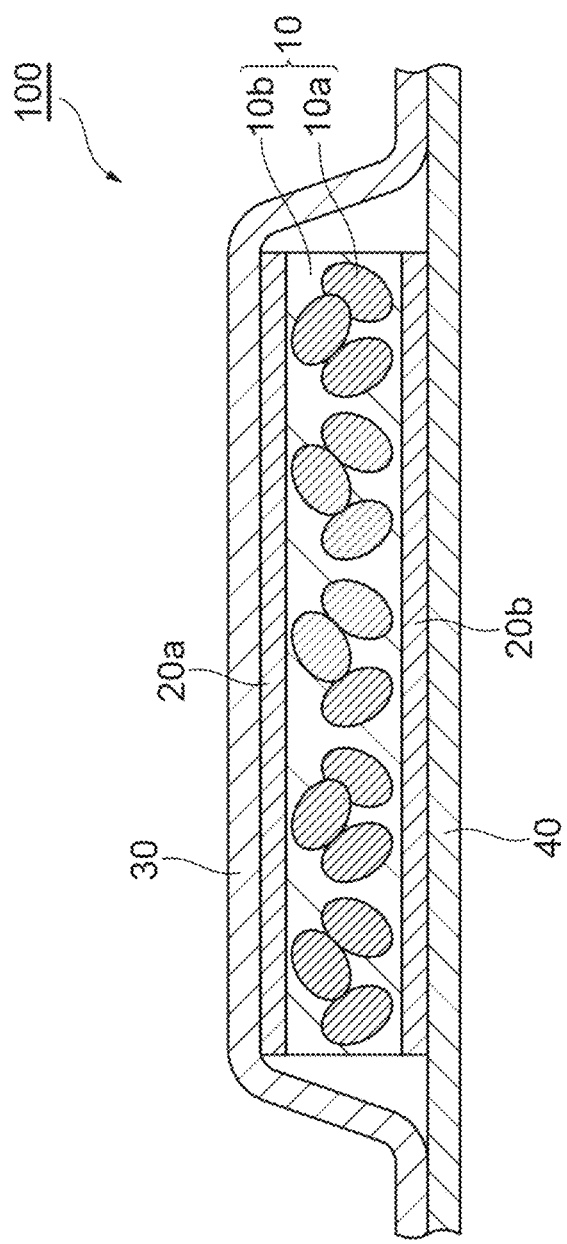
FIG. 1 is a cross-sectional view showing an example of an absorbent article.

Hereinafter, embodiments of the present invention will be described in detail. However, the present invention is not limited to the following embodiments, and can be variously modified and implemented within the scope of the gist thereof.

In the present specification, "acrylic" and "methacrylic" are collectively referred to as "(meth)acrylic". "Acrylate" and "methacrylate" are also referred to as "(meth)acrylate".

"(Poly)" means both of a case where there is a prefix of "poly" and a case where there is no prefix thereof. In a numerical value range described in a stepwise manner in the present specification, an upper limit value or a lower limit value of a numerical value range in a certain step can be arbitrarily combined with an upper limit value or a lower limit value of a numerical value range in another step. In a numerical value range described in the present specification, an upper limit value or a lower limit value of the numerical value range may be replaced with a value shown in Examples. "Water-soluble" means that a solubility of 5% by mass or more is exhibited in water at 25° C. For materials exemplified in the present specification, one kind may be used alone, or two or more kinds may be used in combination. In a case where there are a plurality of substances corresponding to each of components in a composition, a content of each of the components in the composition means the total amount of the plurality of substances present in the composition unless otherwise specified. "Physiological saline" refers to an aqueous solution of 0.9% by mass sodium chloride.

Water-absorbent resin particles of the present embodiment are water-absorbent resin particles in which a gel brightness L* measured by a method including the following steps (A), (B), and (C) in this order is 8 to 60.
(A) 0.1 g of water-absorbent resin particles are uniformly scattered in a colorless and transparent round cell for a color-difference meter having an inner diameter of 30 mm.
(B) 5.0 g of ion-exchanged water is added to the round cell to cause the water-absorbent resin particles to absorb water.
(C) a brightness L* of an obtained gel is measured on a black background after five minutes from the addition of the ion-exchanged water.

The brightness L* in the present specification is one in the L*a*b* colorimetric system and is shown in the range of 0 to 100. More specific measurement method of the gel brightness L* will be described in Examples to be described later.

Since the gel brightness is measured using a black background in the present embodiment, the higher the light transmittance of a gel, the lower the gel brightness. When water-absorbent resin particles in which the gel brightness L* is in the range of 8 to 60 are used in an absorber, the absorber can have a high absorption amount. The reason why such an effect is obtained is not clear, but the inventor of the present invention speculates as follows. However, the present invention is not limited to the following mechanism. Because each of the water-absorbent resin particles of the present embodiment in which the gel brightness L* is in a predetermined range is more uniformly crosslinked, and crosslinking in the particles is more uniform, it is thought that each of the particles uniformly absorbs a liquid, and uniform swelling is caused in the particles when swollen about 50 times, and thereby the brightness of the entire gel becomes 60 or less. Furthermore, when the water-absorbent resin particles of the present embodiment are used in the absorber, when the gel brightness L* is in a predetermined range, water can be absorbed more uniformly by each of the particles and in the particles, and it is thought that the absorption amount as the absorber is improved.

From the viewpoint of further improving the absorption amount of the absorber, the gel brightness L* is preferably 58 or less, more preferably 55 or less, further more preferably 50 or less, and still further more preferably 45 or less. The gel brightness L* may be 10 or more, 20 or more, 30 or more, or 35 or more, for example.

In the water-absorbent resin particles of the present embodiment, the brightness L* in a dry state before water absorption may be 91 or more or 95 or more, for example. The brightness L* in a dry state refers to the brightness L* of the water-absorbent resin particles in which the water content is 10% by mass or less.

The physiological saline retention amount of the water-absorbent resin particles of the present embodiment is preferably 20 g/g or more, 30 g/g or more, 35 g/g or more, 38 g/g or more, 40 g/g or more, 42 g/g or more, or 45 g/g or more from the viewpoint of easily increasing the absorption amount of the absorber. The physiological saline retention amount of the water-absorbent resin particles may be 80 g/g or less, 75 g/g or less, 70 g/g or less, 65 g/g or less, 60 g/g or less, or 55 g/g or less. The physiological saline retention amount of the water-absorbent resin particles is preferably 20 to 80 g/g, more preferably 30 to 55 g/g. The water retention amount may be a value at 25° C. The physiological saline retention amount of the water-absorbent resin particles can be measured by a method described in Examples to be described later.

In the water-absorbent resin particles of the present embodiment, a 5-minute value of non-pressurization DW may be 30 to 80 ml/g. The 5-minute value of non-pressurization DW is preferably 37 ml/g or more, more preferably 41 ml/g or more, and further more preferably 44 ml/g or more from the viewpoint of easily increasing the absorption amount of the absorber. The 5-minute value of non-pressurization DW may be 70 ml/g or less, for example.

The pure water absorption amount (ion-exchanged water absorption amount) of the water-absorbent resin particles of the present embodiment may be 100 to 1000 g/g, and may be 200 to 800 g/g or 300 to 700 g/g. The pure water absorption amount may be a value at 25° C. The pure water absorption amount of the water-absorbent resin particles can be measured by a method described in Examples to be described later.

Examples of the shape of the water-absorbent resin particles of the present embodiment include a substantially spherical shape, a crushed shape, and a granular shape. Furthermore, the water-absorbent resin particles of the present embodiment may be in the form (secondary particles) in which fine particles (primary particles) are aggregated, in addition to the form in which each is composed of a single particle. The median particle diameter of the water-absorbent resin particles (water-absorbent resin particles before water absorption) of the present embodiment may be 250 to 850 μm, 300 to 700 μm, 300 to 600 μm, 330 to 500 μm, or 350 to 400 μm. The water-absorbent resin particles of the present embodiment may have a desired particle size distribution at the time of being obtained by a production method to be described later, but the particle size distribution may be adjusted by performing an operation such as particle size adjustment using classification with a sieve.

The water-absorbent resin particles of the present embodiment can contain a crosslinked polymer (a crosslinked polymer having a structural unit derived from an ethylenically unsaturated monomer) obtained by polymerizing a monomer containing an ethylenically unsaturated monomer, as polymer particles, for example. That is, the water-absorbent resin particles of the present embodiment can have a polymer having structural unit derived from an ethylenically unsaturated monomer, and can contain polymer particles including a crosslinked polymer having a structural unit derived from an ethylenically unsaturated monomer. As the ethylenically unsaturated monomer, a water-soluble ethylenically unsaturated monomer can be used. Examples of the polymerization method include a reverse phase suspension polymerization method, an aqueous solution polymerization method, a bulk polymerization method, and a precipitation polymerization method. Among these, the reverse phase suspension polymerization method or the aqueous solution polymerization method is preferable from the viewpoint of ensuring good water-absorbent characteristics (such as a water retention amount) of the obtained water-absorbent resin particles and facilitating control of the polymerization reaction. In the following, as a method for polymerizing an ethylenically unsaturated monomer, a reverse phase suspension polymerization method will be described as an example.

The ethylenically unsaturated monomer is preferably water-soluble, and examples thereof include (meth)acrylic acid and a salt thereof, 2-(meth)acrylamide-2-methylpropanesulfonic acid and a salt thereof, (meth)acrylamide, N,N-dimethyl (meth)acrylamide, 2-hydroxyethyl (meth) acrylate, N-methylol (meth)acrylamide, polyethylene glycol mono(meth)acrylate, N,N-diethylaminoethyl (meth)acrylate, N,N-diethylaminopropyl (meth)acrylate, and diethylaminopropyl (meth)acrylamide. In a case where the ethylenically unsaturated monomer has an amino group, the amino group may be quaternized. The ethylenically unsaturated monomer may be used alone, or may be used in combination of two or more kinds thereof. The functional group, such as a carboxyl group and an amino group, of the above-mentioned monomer can function as a functional group capable of crosslinking in a surface crosslinking step to be described later.

Among these, from the viewpoint of industrial availability, the ethylenically unsaturated monomer preferably contains at least one compound selected from the group consisting of (meth)acrylic acid and a salt thereof, acrylamide, methacrylamide, and N, N-dimethyl acrylamide, and more preferably contains at least one compound selected from the group consisting of (meth)acrylic acid and a salt thereof, and acrylamide. From the viewpoint of further enhancing water-absorbent characteristics (such as a water retention amount), the ethylenically unsaturated monomer further more preferably contains at least one compound selected from the group consisting of (meth)acrylic acid and a salt thereof. That is, the water-absorbent resin particles preferably have a structural unit derived from at least one selected from the group consisting of (meth)acrylic acid and a salt thereof As the monomer for obtaining the water-absorbent resin particles, a monomer other than the above-mentioned ethylenically unsaturated monomer may be used. Such a monomer can be used by being mixed with an aqueous solution containing the above-mentioned ethylenically unsaturated monomer, for example. The use amount of the ethylenically unsaturated monomer may be 70 to 100 mol %, and may be 80 to 100 mol %, 90 to 100 mol %, 95 to 100 mol %, or 100 mol % with respect to the total amount of the monomer (the total amount of the monomer for obtaining the water-absorbent resin particles. For example, the total amount of the monomers that provide a structural unit of the crosslinked polymer. The same applies hereinafter). Among these, the ratio of (meth)acrylic acid and a salt thereof may be 70 to 100 mol %, and may be 80 to 100 mol %, 90 to 100 mol %, 95 to 100 mol %, or 100 mol % with respect to the total amount of the monomers. "Ratio of (meth)acrylic acid and a salt thereof" means the ratio of the total amount of (meth)acrylic acid and a salt thereof.

According to the present embodiment, as an example of the water-absorbent resin particles, it is possible to provide the water-absorbent resin particle containing a crosslinked polymer having a structural unit derived from an ethylenically unsaturated monomer, in which the ethylenically unsaturated monomer contains at least one compound selected from the group consisting of (meth)acrylic acid and a salt thereof, and the ratio of (meth)acrylic acid and a salt thereof is 70 to 100 mol % with respect to the total amount of the monomer for obtaining the water-absorbent resin particles.

The ethylenically unsaturated monomer is usually preferably used as an aqueous solution. The concentration of the ethylenically unsaturated monomer in the aqueous solution containing the ethylenically unsaturated monomer (hereinafter, simply referred to as "monomer aqueous solution") is preferably 20% by mass or more and a saturated concentration or less, more preferably 25 to 70% by mass, and further more preferably 30 to 55% by mass. Examples of the water used in the aqueous solution include tap water, distilled water, and ion-exchanged water.

In a case where the ethylenically unsaturated monomer has an acid group, the monomer aqueous solution may be used by neutralizing the acid group with an alkaline neutralizing agent. The degree of neutralization of the ethylenically unsaturated monomer by the alkaline neutralizing agent is preferably 10 to 100 mol %, more preferably 50 to 90 mol %, and further more preferably 60 to 80 mol % of the acid group in the ethylenically unsaturated monomer, from the viewpoint of increasing an osmotic pressure of the obtained water-absorbent resin particles, and further enhancing water-absorbent characteristics (such as a water retention amount). Examples of the alkaline neutralizing agent include alkali metal salts such as sodium hydroxide, sodium carbonate, sodium hydrogen carbonate, potassium hydroxide, and potassium carbonate; and ammonia. The alkaline neutralizing agent may be used alone, or may be used in combination of two or more kinds thereof. The alkaline neutralizing agent may be used in the form of an aqueous solution to simplify the neutralization operation. Neutralization of the acid group of the ethylenically unsaturated monomer can be performed by adding an aqueous solution of sodium hydroxide, potassium hydroxide, or the like dropwise in the above-mentioned monomer aqueous solution and mixing therewith.

In a reverse phase suspension polymerization method, a monomer aqueous solution is dispersed in a hydrocarbon dispersion medium in the presence of a surfactant, and polymerization of the ethylenically unsaturated monomer can be performed using a radical polymerization initiator or the like.

Examples of the surfactant include a nonionic surfactant and an anionic surfactant. Examples of the nonionic surfactant include sorbitan fatty acid esters, polyglycerin fatty acid esters, sucrose fatty acid esters, polyoxyethylene sorbitan fatty acid esters, polyoxyethylene glycerin fatty acid esters, sorbitol fatty acid esters, polyoxyethylene sorbitol fatty acid esters, polyoxyethylene alkyl ethers, polyoxyethylene alkylphenyl ethers, polyoxyethylene castor oil, polyoxyethylene hydrogenated castor oil, alkylallyl formaldehyde condensed polyoxyethylene ethers, polyoxyethylene polyoxypropylene block copolymers, polyoxyethylene polyoxypropyl alkyl ethers, and polyethylene glycol fatty acid esters. Examples of the anionic surfactant include fatty acid salts, alkylbenzene sulfonate, alkylmethyl taurate, polyoxyethylene alkylphenyl ether sulfuric acid ester salts, polyoxyethylene alkyl ether sulfonic acid salts, phosphoric acid esters of polyoxyethylene alkyl ethers, and phosphoric acid esters of polyoxyethylene alkyl allyl ethers. The surfactant may be used alone, or may be used in combination of two or more kinds thereof From the viewpoint of a good state of the W/O type reverse phase suspension, easily obtaining water-absorbent resin particles having a suitable particle diameter, and industrial availability, the surfactant preferably contains at least one compound selected from the group consisting of sorbitan fatty acid esters, polyglycerin fatty acid esters, and sucrose fatty acid esters. From the viewpoint of easily obtaining an appropriate particle size distribution of the water-absorbent resin particles, and from the viewpoint of easily improving water-absorbent characteristics (such as a water retention amount) of the water-absorbent resin particles and performances of the absorber and the absorbent article using the same, the surfactant preferably contains sucrose fatty acid ester, and more preferably contains sucrose stearic acid ester.

The use amount of the surfactant is preferably 0.05 to 10 parts by mass, more preferably 0.08 to 5 parts by mass, and further more preferably 0.1 to 3 parts by mass with respect to 100 parts by mass of the monomer aqueous solution, from the viewpoint of obtaining a sufficient effect on the use amount and economic efficiency.

In the reverse phase suspension polymerization, a polymeric dispersant may be used in combination with the above-mentioned surfactant. Examples of the polymeric dispersant include maleic anhydride-modified polyethylene, maleic anhydride-modified polypropylene, a maleic anhydride-modified ethylene-propylene copolymer, a maleic anhydride-modified EPDM (ethylene propylene diene terpolymer), maleic anhydride-modified polybutadiene, a maleic anhydride-ethylene copolymer, a maleic anhydride-propylene copolymer, a maleic anhydride-ethylene-propylene copolymer, a maleic anhydride-butadiene copolymer, polyethylene, polypropylene, an ethylene-propylene copolymer, oxidized polyethylene, oxidized polypropylene, an oxidized ethylene-propylene copolymer, an ethylene-acrylic acid copolymer, ethyl cellulose, and ethyl hydroxyethyl cellulose. The polymeric dispersant may be used alone or may be used in combination of two or more kinds thereof. From the viewpoint of better dispersion stability of the monomer, the polymeric dispersant is preferably at least one selected from the group consisting of maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene, and an oxidized ethylene-propylene copolymer.

The use amount of the polymeric dispersant is preferably 0.05 to 10 parts by mass, more preferably 0.08 to 5 parts by mass, and further more preferably 0.1 to 3 parts by mass with respect to 100 parts by mass of the monomer aqueous solution, from the viewpoint of obtaining a sufficient effect on the use amount and economic efficiency.

The hydrocarbon dispersion medium may contain at least one compound selected from the group consisting of chain aliphatic hydrocarbons having 6 to 8 carbon atoms and alicyclic hydrocarbons having 6 to 8 carbon atoms. Examples of the hydrocarbon dispersion medium include chain aliphatic hydrocarbons such as n-hexane, n-heptane, 2-methylhexane, 3-methylhexane, 2,3-dimethylpentane, 3-ethylpentane, and n-octane; alicyclic hydrocarbons such as cyclohexane, methylcyclohexane, cyclopentane, methylcyclopentane, trans-1,2-dimethylcyclopentane, cis-1,3-dimethylcyclopentane, and trans-1,3-dimethylcyclopentane; and aromatic hydrocarbons such as benzene, toluene, and xylene. The hydrocarbon dispersion medium may be used alone, or may be used in combination of two or more kinds thereof The hydrocarbon dispersion medium may contain at least one selected from the group consisting of n-heptane and cyclohexane from the viewpoint of industrial availability and stable quality. In addition, from the same viewpoint, as the mixture of the above-mentioned hydrocarbon dispersion medium, for example, a commercially available Exxsol Heptane (manufactured by ExxonMobil: containing 75% to 85% of n-heptane and isomeric hydrocarbons) may be used.

The use amount of the hydrocarbon dispersion medium is preferably 30 to 1000 parts by mass, more preferably 40 to 500 parts by mass, and further more preferably 50 to 400 parts by mass with respect to 100 parts by mass of the monomer aqueous solution, from the viewpoint of appropriately removing the heat of polymerization and easily controlling the polymerization temperature. In a case where the use amount of the hydrocarbon dispersion medium is 30 parts by mass or more, the polymerization temperature tends to be easily controlled. In a case where the use amount of the hydrocarbon dispersion medium is 1000 parts by mass or less, the productivity of polymerization tends to be improved, which is economical.

The radical polymerization initiator is preferably water-soluble, and examples thereof include persulfates such as potassium persulfate, ammonium persulfate, and sodium persulfate; peroxides such as methyl ethyl ketone peroxide, methyl isobutyl ketone peroxide, di-t-butyl peroxide, t-butyl cumyl peroxide, t-butyl peroxyacetate, t-butyl peroxyisobutyrate, t-butyl peroxypivalate, and hydrogen peroxide; and azo compounds such as 2,2'-azobis(2-amidinopropane) dihydrochloride, 2,2'-azobis[2-(N-phenylamidino)propane] dihydrochloride, 2,2'-azobis[2-(N-allylamidino)propane] dihydrochloride, 2,2'-azobis[2-(2-imidazolin-2-yl)propane] dihydrochloride, 2,2'-azobis{2-[1-(2-hydroxyethyl)-2-imidazolin-2-yl]propane} dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)-propionamide], and 4,4'-azobis(4-cyanovaleric acid). The radical polymerization initiator may be used alone, or may be used in combination of two or more kinds thereof. The radical polymerization initiator is preferably at least one selected from the group consisting of potassium persulfate, ammonium persulfate, sodium persulfate, 2,2'-azobis(2-amidinopropane) dihydrochloride, 2,2'-azobis[2-(2-imidazolin-2-yl)propane] dihydrochloride, and 2,2'-azobis{2-[1-(2-hydroxyethyl)-2-imidazolin-2-yl]propane} dihydrochloride; more preferably potassium persulfate, ammonium persulfate, sodium persulfate; and further more preferably sodium persulfate.

The use amount of the radical polymerization initiator may be 0.05 to 10 mmol with respect to 1 mol of the ethylenically unsaturated monomer. In a case where the use amount of the radical polymerization initiator is 0.05 mmol or more, the polymerization reaction does not require a long time and is efficient. In a case where the use amount of the radical polymerization initiator is 10 mmol or less, the occurrence of a rapid polymerization reaction is easily inhibited.

The above-mentioned radical polymerization initiator can also be used as a redox polymerization initiator in combination with a reducing agent such as sodium sulfite, sodium hydrogen sulfite, ferrous sulfate, and L-ascorbic acid.

At the time of the polymerization reaction, the monomer aqueous solution used for the polymerization may contain a chain transfer agent. Examples of the chain transfer agent include hypophosphites, thiols, thiolic acids, secondary alcohols, and amines.

The monomer aqueous solution used for the polymerization may contain a thickener in order to control the particle diameter of the water-absorbent resin particles. Examples of the thickener include hydroxyethyl cellulose, hydroxypropyl cellulose, methyl cellulose, carboxymethyl cellulose, polyethylene glycol, polyacrylamide, polyethyleneimine, dextrin, sodium alginate, polyvinyl alcohol, polyvinylpyrrolidone, and polyethylene oxide. In a case where the stirring speed at the time of polymerization is the same, the higher the viscosity of the monomer aqueous solution, the larger the median particle diameter of the obtained particles tends to be.

Internal crosslinking by self-crosslinking may occur during polymerization, but crosslinking may be performed by using an internal crosslinking agent. In a case where an internal crosslinking agent is used, water-absorbent characteristics (such as a water retention amount) of the water-absorbent resin particles are easily controlled. The internal crosslinking agent is usually added to a reaction solution during the polymerization reaction. Examples of the internal crosslinking agent include di or tri (meth)acrylic acid esters of polyols such as ethylene glycol, propylene glycol, trimethylolpropane, glycerin, polyoxyethylene glycol, polyoxypropylene glycol, and polyglycerin; unsaturated polyesters obtained by reacting the above-mentioned polyols with unsaturated acids (such as maleic acid and fumaric acid); bis(meth)acrylamides such as N,N'-methylenebis(meth) acrylamide; di or tri (meth)acrylic acid esters obtained by reacting a polyepoxide with (meth)acrylic acid; carbamyl di(meth)acrylate esters obtained by reacting a polyisocyanate (such as tolylene diisocyanate and hexamethylene diisocyanate) with hydroxyethyl (meth)acrylate; compounds having two or more polymerizable unsaturated groups, such as allylated starch, allylated cellulose, diallyl phthalate, N,N',N''-triallyl isocyanurate, and divinylbenzene; polyglycidyl compounds such as (poly)ethylene glycol diglycidyl ether, (poly)propylene glycol diglycidyl ether, (poly)glycerin diglycidyl ether, (poly)glycerin triglycidyl ether, (poly) propylene glycol polyglycidyl ether, and polyglycerol polyglycidyl ether; haloepoxy compounds such as epichlorohydrin, epibromohydrin, and α-methyl epichlorohydrin; and compounds having two or more reactive functional groups, such as isocyanate compounds (such as 2,4-tolylene diisocyanate and hexamethylene diisocyanate). The internal crosslinking agent may be used alone, or may be used in combination of two or more kinds thereof. The internal crosslinking agent is preferably a polyglycidyl compound, is more preferably a diglycidyl ether compound, and is further more preferably at least one selected from the group consisting of (poly)ethylene glycol diglycidyl ether, (poly) propylene glycol diglycidyl ether, and (poly)glycerin diglycidyl ether.

The use amount of the internal crosslinking agent is preferably 30 mmol or less, more preferably 0.01 to 10 mmol, further more preferably 0.012 to 5 mmol, particularly preferably 0.015 to 1 mmol, extremely preferably 0.02 to 0.1 mmol, and extraordinarily preferably 0.025 to 0.08 mmol, per 1 mol of the ethylenically unsaturated monomer, from the viewpoint of easily obtaining a better absorber swelling capacity in an absorbent article, and from the viewpoint of suppressing water-soluble property by appropriately crosslinking the obtained polymer to easily obtain the sufficient water absorption amount.

It is possible to perform heating while stirring in a state of mixing an aqueous phase containing an ethylenically unsaturated monomer, a radical polymerization initiator, and optionally an internal crosslinking agent, and an oil phase containing a hydrocarbon dispersion medium, a surfactant, and optionally a polymeric dispersant or the like, and to perform reverse phase suspension polymerization in a water-in-oil system.

When performing the reverse phase suspension polymerization, a monomer aqueous solution containing an ethylenically unsaturated monomer is dispersed in a hydrocarbon dispersion medium in the presence of a surfactant (if necessary, additionally a polymeric dispersant). At this time, before the start of the polymerization reaction, the timing of adding the surfactant, the polymeric dispersant, or the like may be either before or after the addition of the monomer aqueous solution.

Among these, from the viewpoint of easily reducing the amount of the hydrocarbon dispersion medium remaining in the obtained water-absorbent resin, it is preferable to perform polymerization after dispersing the monomer aqueous solution in the hydrocarbon dispersion medium in which the polymeric dispersant is dispersed and then further dispersing the surfactant.

Reverse phase suspension polymerization can be performed in one stage, or in multiple stages of two or more stages. Reverse phase suspension polymerization is preferably performed in two to three stages from the viewpoint of increasing productivity.

In a case where reverse phase suspension polymerization is performed in multiple stages of two or more stages, a first stage reverse phase suspension polymerization is performed, an ethylenically unsaturated monomer is added to the reaction mixture obtained in the first polymerization reaction and mixed therewith, and second and subsequent stages of reverse phase suspension polymerization may be performed in the same method as the first stage. In the reverse phase suspension polymerization in each stage of the second and subsequent stages, in addition to the ethylenically unsaturated monomer, the above-mentioned radical polymerization initiator and/or internal crosslinking agent is preferably added in a range of a molar ratio of each component with respect to the above-mentioned ethylenically unsaturated monomer, based on an amount of the ethylenically unsaturated monomer added at the time of the second and subsequent stages of reverse phase suspension polymerization, to perform reverse phase suspension polymerization. In the reverse phase suspension polymerization in each stage of second and subsequent stages, an internal crosslinking agent may be used if necessary. In a case of using the internal crosslinking agent, the internal crosslinking agent is preferably added within a range of the molar ratio of each component with respect to the above-mentioned ethylenically unsaturated monomer based on the amount of the ethylenically unsaturated monomer provided in each stage, to perform reverse phase suspension polymerization.

The temperature of the polymerization reaction varies depending on the used radical polymerization initiator, and the temperature is preferably 20° C. to 150° C., and more preferably 40° C. to 120° C., from the viewpoint of rapidly proceeding the polymerization and shortening the polymerization time to enhance economic efficiency, and easily removing polymerization heat and smoothly performing reaction. The reaction time is usually 0.5 to 4 hours. The completion of the polymerization reaction can be confirmed by stopping the temperature rise in the reaction system. Thus, the polymer of the ethylenically unsaturated monomer is usually obtained in a state of a hydrogel.

After the polymerization, a post-polymerization crosslinking agent may be added to the obtained hydrogel-like polymer and heated to perform crosslinking By performing post-polymerization crosslinking, a degree of crosslinking of the hydrogel-like polymer can be increased, and water-absorbent characteristics (such as a water retention amount) can be further improved.

Examples of the crosslinking agent for performing post-polymerization include polyols such as ethylene glycol, propylene glycol, 1,4-butanediol, trimethylolpropane, glycerin, polyoxyethylene glycol, polyoxypropylene glycol, and polyglycerin; compounds having two or more epoxy groups, such as (poly)ethylene glycol diglycidyl ether, (poly)propylene glycol diglycidyl ether, and (poly)glycerin diglycidyl ether; haloepoxy compounds such as epichlorohydrin, epibromohydrin, and α-methyl epichlorohydrin; compounds having two or more isocyanate groups such as 2,4-tolylene diisocyanate and hexamethylene diisocyanate; oxazoline compounds such as 1,2-ethylenebisoxazoline; carbonate compounds such as ethylene carbonate; and hydroxyalkylamide compounds such as bis[N,N-di(β-hydroxyethyl)]adipamide. Among these, polyglycidyl compounds such as (poly)ethylene glycol diglycidyl ether, (poly)glycerin diglycidyl ether, (poly)glycerin triglycidyl ether, (poly)propylene glycol polyglycidyl ether, and polyglycerol polyglycidyl ether are preferable. The crosslinking agent may be used alone, or may be used in combination of two or more kinds thereof The amount of the post-polymerization crosslinking agent may be 30 mmol or less, 10 mmol or less, or 0.01 to 5 mmol per 1 mol of the ethylenically unsaturated monomer, from the viewpoint of easily obtaining suitable water-absorbent characteristics (such as a water retention amount).

The timing of adding the post-polymerization crosslinking agent may be after the polymerization of the ethylenically unsaturated monomer used for the polymerization, and in the case of multiple-stage polymerization, it is preferable to add after the multiple-stage polymerization. Considering fluctuation in water due to heat generation at the time of polymerization and after polymerization, retention due to process delay, opening of the system at the time of addition of the crosslinking agent, addition of water due to the addition of the crosslinking agent, or the like, the post-polymerization crosslinking agent is preferably added in a region of [water content (immediately after polymerization) ±3% by mass] from the viewpoint of water content (to be described later).

Subsequently, the polymer particles (for example, polymer particles having a structural unit derived from an ethylenically unsaturated monomer) are obtained by drying in order to remove water from the obtained hydrogel-like polymer. Examples of a drying method include (a) a method of removing water by performing azeotropic distillation by heating from outside in a state where a hydrogel-like polymer is dispersed in a hydrocarbon dispersion medium, and refluxing the hydrocarbon dispersion medium, (b) a method of taking out a hydrogel-like polymer by decantation and drying under reduced pressure, and (c) a method of filtering the hydrogel-like polymer with a filter and drying under reduced pressure. Among these, it is preferable to use the method (a) due to the simplicity in the production process.

It is possible to adjust the particle diameter of water-absorbent resin particles by adjusting a rotation speed of a stirrer during the polymerization reaction, or by adding a flocculant into the system after the polymerization reaction or in the initial stage of drying. By adding a flocculant, it is possible to increase the particle diameter of the obtained water-absorbent resin particles. As the flocculant, an inorganic flocculant can be used. Examples of the inorganic flocculant (for example, powdered inorganic flocculant) include silica, zeolite, bentonite, aluminum oxide, talc, titanium dioxide, kaolin, clay, and hydrotalcite. From the viewpoint of better flocculation effect, the flocculant is preferably at least one selected from the group consisting of silica, aluminum oxide, talc, and kaolin.

In the reverse phase suspension polymerization, a method of adding the flocculant is preferably a method of preliminarily dispersing a flocculant in a hydrocarbon dispersion medium or water of the same type as that used in the polymerization, and then mixing into a hydrocarbon dispersion medium containing a hydrogel-like polymer under stirring.

The addition amount of the flocculant is preferably 0.001 to 1 part by mass, more preferably 0.005 to 0.5 part by mass, and further more preferably 0.01 to 0.2 parts by mass with respect to 100 parts by mass of the ethylenically unsaturated monomer used for the polymerization. In a case where the addition amount of the flocculant is within the above-mentioned range, water-absorbent resin particles having a target particle size distribution can be easily obtained.

In the production of the water-absorbent resin particles, it is preferable to perform surface crosslinking of a surface portion (surface and in the vicinity of surface) of a hydrogel-like polymer using a crosslinking agent in a drying step (water removing step) or any subsequent steps. By performing surface crosslinking, a gel brightness, water-absorbent characteristics (such as a water retention amount), and the like of the water-absorbent resin particles are easily controlled. The surface crosslinking is preferably performed at the timing when the hydrogel-like polymer has a specific water content. The timing of surface crosslinking is preferably when the water content of the hydrogel-like polymer is 5% to 50% by mass, more preferably when the water content of the hydrogel-like polymer is 10% to 40% by mass, and further more preferably when the water content of the hydrogel-like polymer is 15% to 35% by mass.

The water content (mass %) of the hydrogel-like polymer is calculated by the following formula.

$$\text{Water content}=[Ww/(Ww+Ws)]\times 100$$

Ww: Water amount of a hydrogel-like polymer obtained by adding water amount used if necessary when mixing a flocculant, a surface crosslinking agent, or the like to an amount obtained by subtracting water amount discharged to the outside of the system in the drying step, from water amount contained in a monomer aqueous solution before polymerization in the entire polymerization step.

Ws: Solid content calculated from the charged amount of materials such as ethylenically unsaturated monomer, crosslinking agent, and initiator that constitute a hydrogel-like polymer.

Examples of the crosslinking agent (surface crosslinking agent) for performing surface crosslinking include compounds having two or more reactive functional groups. Examples of the surface crosslinking agent include polyols such as ethylene glycol, propylene glycol, 1,4-butanediol, trimethylolpropane, glycerin, polyoxyethylene glycol, polyoxypropylene glycol, and polyglycerin; polyglycidyl compounds such as (poly)ethylene glycol diglycidyl ether, (poly)

glycerin diglycidyl ether, (poly)glycerin triglycidyl ether, trimethylolpropane triglycidyl ether, (poly)propylene glycol polyglycidyl ether, and (poly)glycerol polyglycidyl ether; haloepoxy compounds such as epichlorohydrin, epibromohydrin, and α-methyl epichlorohydrin; isocyanate compounds such as 2,4-tolylene diisocyanate and hexamethylene diisocyanate; oxetane compounds such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol, and 3-butyl-3-oxetane ethanol; oxazoline compounds such as 1,2-ethylenebisoxazoline; carbonate compounds such as ethylene carbonate; and hydroxyalkylamide compounds such as bis[N,N-di(β-hydroxyethyl)]adipamide. The surface crosslinking agent may be used alone, or may be used in combination of two or more kinds thereof. The surface crosslinking agent is preferably a polyglycidyl compound, and more preferably at least one selected from the group consisting of (poly)ethylene glycol diglycidyl ether, (poly)glycerin diglycidyl ether, (poly)glycerin triglycidyl ether, (poly)propylene glycol polyglycidyl ether, and polyglycerol polyglycidyl ether.

The use amount of the surface crosslinking agent is preferably 0.01 to 20 mmol, more preferably 0.05 to 10 mmol, further more preferably 0.1 to 5 mmol, particularly preferably 0.15 to 1 mmol, and extremely preferably 0.2 to 0.5 mmol per 1 mol of the ethylenically unsaturated monomer used for polymerization, from the viewpoint of easily obtaining suitable water-absorbent characteristics (such as a water retention amount).

After the surface crosslinking, it is possible to obtain polymer particles which are surface-crosslinked dried products by distilling off water and a hydrocarbon dispersion medium, drying under heating and reduced pressure, or the like with a known method.

The polymerization reaction can be carried out using various stirrers having a stirring blade. As the stirring blade, it is possible to use a flat plate blade, a lattice blade, a paddle blade, a propeller blade, an anchor blade, a turbine blade, a Pfaudler blade, a ribbon blade, a full zone blade, a max blend blade, or the like. A flat plate blade has a shaft (stirring shaft) and a flat plate portion (stirring portion) disposed around the shaft. The flat plate portion may have a slit or the like. In a case where the flat plate blade is used as the stirring blade, it is easy to uniformly carry out the crosslinking reaction in polymer particles, and it is easy to adjust the gel brightness within a desired range while maintaining water-absorbent characteristics such as a water retention amount.

The water-absorbent resin particles of the present embodiment may be constituted of only the polymer particles, but can further contain additional components such as a gel stabilizer, a metal chelating agent (ethylenediaminetetraacetic acid and a salt thereof, diethylenetriamine pentaacetic acid and a salt thereof, and the like, for example, diethylenetriamine pentaacetic acid pentasodium), and a flowability improver (lubricant) of the polymer particles. Additional components can be disposed inside the polymer particles, on the surface of the polymer particles, or both thereof.

The water-absorbent resin particles may contain a plurality of inorganic particles disposed on the surface of the polymer particles. For example, by mixing the polymer particles and the inorganic particles, it is possible to dispose the inorganic particles on the surface of the polymer particles. The inorganic particles may be silica particles such as amorphous silica.

In a case where the water-absorbent resin particles include inorganic particles disposed on the surface of the polymer particles, the content of the inorganic particles may be within the following range based on the total mass of the polymer particles. The content of the inorganic particles may be 0.05% by mass or more, 0.1% by mass or more, 0.15% by mass or more, or 0.2% by mass or more. The content of the inorganic particles may be 5.0% by mass or less, 3.0% by mass or less, 1.0% by mass or less, 0.5% by mass or less, or 0.3% by mass or less.

The inorganic particles here usually have a minute size as compared with the size of the polymer particles. For example, the average particle diameter of the inorganic particles may be 0.1 to 50 µm, 0.5 to 30 µm, or 1 to 20 µm. The average particle diameter can be measured by a pore electric resistance method or a laser diffraction/scattering method depending on the characteristics of the particles.

The water-absorbent resin particles of the present embodiment have better absorbency for a body fluid such as urine and blood, and can be applied to the field of sanitary products such as paper diapers, sanitary napkins, and tampons, pet sheets, and treatment materials for animal excrement such as dog or cat toilet litters, for example.

The water-absorbent resin particles of the present embodiment can be suitably used for the absorber. The absorber of the present embodiment contains the water-absorbent resin particles of the present embodiment. The content of the water-absorbent resin particles in the absorber is preferably 100 to 1000 g (that is, 100 to 1000 $g/m^2$), more preferably 150 to 800 $g/m^2$, and further more preferably 200 to 700 $g/m^2$, per square meter of the absorber from the viewpoint of obtaining sufficient liquid absorption performances when the absorber is used in the absorbent article. The above-mentioned content is preferably 100 $g/m^2$ or more from the viewpoint of exhibiting sufficient liquid absorption performances as the absorbent article. The above-mentioned content is preferably 1000 $g/m^2$ or less from the viewpoint of inhibiting occurrence of a gel blocking phenomenon.

The absorber may further contain a fibrous substance for example, in addition to the water-absorbent resin particles. The absorber may be a mixture containing the water-absorbent resin particles and the fibrous substance, for example. The mass ratio of the water-absorbent resin particles in the absorber may be 2% to 100% by mass, is preferably 10% to 80% by mass, and more preferably 20% to 70% by mass with respect to a total of the water-absorbent resin particles and the fibrous substance. For example, the structure of the absorber may be a form in which the water-absorbent resin particles and the fibrous substance are uniformly mixed, may be a form in which the water-absorbent resin particles are sandwiched between the fibrous substances formed in the shape of a sheet or a layer, or may be other forms.

Examples of the fibrous substance include cellulosic fibers such as finely pulverized wood pulp, cotton, cotton linter, rayon; and cellulose acetate; and synthetic fibers such as polyamide, polyester, and polyolefin. The average fiber length of the fibrous substance is usually 0.1 to 10 mm, and may be 0.5 to 5 mm. In addition, the fibrous substance may be a mixture of the above-mentioned fibers.

In order to enhance the morphological retention before and during use of the absorber, the fibers may be adhered to each other by adding an adhesive binder to the fibrous substance. Examples of the adhesive binder include thermal bonding synthetic fibers, hot melt adhesives, and adhesive emulsions.

Examples of the thermal bonding synthetic fiber include a total fusion type binder such as polyethylene, polypropylene, and an ethylene-propylene copolymer; and a non-total fusion type binder made of a side-by-side or core-sheath structure of polypropylene and polyethylene. In the above-mentioned non-total fusion type binder, only the polyethylene portion is thermal-bonded. Examples of the hot melt adhesive include a blend of a base polymer such as ethylene-vinyl acetate copolymer, styrene-isoprene-styrene block copolymer, styrene-butadiene-styrene block copolymer, styrene-ethylene-butylene-styrene block copolymer, styrene-ethylene-propylene-styrene block copolymer, and amorphous polypropylene with a tackifier, a plasticizer, an antioxidant, or the like.

Examples of the adhesive emulsion include a polymerization product of at least one or more monomers selected from the group consisting of methyl methacrylate, styrene, acrylonitrile, 2-ethylhexyl acrylate, butyl acrylate, butadiene, ethylene, and vinyl acetate. These adhesive binders may be used alone, or may be used in combination of two or more.

The absorber of the present embodiment may further contain an additive such as an inorganic powder (for example, amorphous silica), a deodorant, a dye, a pigment, an antibacterial agent, a fragrance, and a sticking agent. These additives can impart various functions to the absorber. In a case where the water-absorbent resin particles contain inorganic particles, the absorber may contain an inorganic powder in addition to the inorganic particles of the water-absorbent resin particles. Examples of the inorganic powder include silicon dioxide, zeolite, kaolin, and clay.

The shape of the absorber of the present embodiment is not particularly limited, and may be a sheet shape, for example. The thickness of the absorber (for example, thickness of the sheet shaped absorber) may be 0.1 to 20 mm or 0.3 to 15 mm, for example.

In addition to the absorber, the absorbent article of the present embodiment may include a core wrap, a liquid permeable top sheet, and a liquid impermeable back sheet, for example. The core wrap retains the absorber. The liquid permeable top sheet is disposed on the outermost part at the side where the liquid to be absorbed enters. The liquid impermeable back sheet is disposed on the outermost part at the opposite side to the side where the liquid to be absorbed enters.

Examples of the absorbent article include diapers (for example, paper diapers), toilet training pants, incontinence pads, sanitary products (sanitary napkins, tampons, and the like), sweat pads, pet sheets, portal toilet members, and animal excrement treatment materials.

FIG. 1 is a cross-sectional view showing an example of an absorbent article. An absorbent article 100 shown in FIG. 1 includes an absorber 10, core wraps 20a and 20b, a liquid permeable top sheet 30, and a liquid impermeable back sheet 40. In the absorbent article 100, the liquid impermeable back sheet 40, the core wrap 20b, the absorber 10, the core wrap 20a, and the liquid permeable top sheet 30 are laminated in this order. In FIG. 1, there is a portion shown so that there is a gap between the members, but the members may be in close contact with each other without the gap.

The absorber 10 has a water-absorbent resin particle 10a and a fiber layer 10b containing a fibrous substance. The water-absorbent resin particles 10a are dispersed in the fiber layer 10b.

The core wrap 20a is disposed on one surface side of the absorber 10 (an upper side of the absorber 10 in FIG. 1) in a state of being in contact with the absorber 10. The core wrap 20b is disposed on the other surface side of the absorber 10 (a lower side of the absorber 10 in FIG. 1) in a state of being in contact with the absorber 10. The absorber 10 is disposed between the core wrap 20a and the core wrap 20b.

The core wrap 20a and the core wrap 20b each have a main surface having the same size as that of the absorber 10, for example. By using the core wrap, it is possible to maintain shape retainability of the absorber and prevent falloff or flow of the water-absorbent resin particles and the like constituting the absorber. Examples of the core wrap include non-woven fabrics, woven fabrics, tissues, synthetic resin films having liquid permeation holes, and net-like sheets having a mesh, and from the viewpoint of economic efficiency, tissues obtained by wet-type molding pulverized pulp are preferably used.

The liquid permeable top sheet 30 is disposed on the outermost part at the side where the liquid to be absorbed enters. The liquid permeable top sheet 30 is disposed on the core wrap 20a in a state of being in contact with the core wrap 20a. The liquid impermeable back sheet 40 is disposed on the outermost part at the opposite side to the liquid permeable top sheet 30 in the absorbent article 100. The liquid impermeable back sheet 40 is disposed on a lower side of the core wrap 20b in a state of being in contact with the core wrap 20b. The liquid permeable top sheet 30 and the liquid impermeable back sheet 40 have a main surface wider than the main surface of the absorber 10, and outer edges of the liquid permeable top sheet 30 and the liquid impermeable back sheet 40 are present around the absorber 10 and the core wraps 20a and 20b.

Examples of the liquid permeable top sheet 30 include a non-woven fabric and a porous sheet. Examples of the non-woven fabric include thermal bonded non-woven fabrics, air through non-woven fabrics, resin bonded non-woven fabrics, spunbond non-woven fabrics, melt-blown non-woven fabrics, spunbond/melt-blown/spunbond non-woven fabrics, airlaid non-woven fabrics, spunlace non-woven fabrics, and point-bonded non-woven fabrics. Among these, thermal bonded non-woven fabrics, air through non-woven fabrics, spunbond non-woven fabrics, and spunbond/melt-blown/spunbond non-woven fabrics are preferably used.

As a constituent material for the liquid permeable top sheet 30, resins or fibers known in the technical field can be used, and from the viewpoint of liquid permeability, flexibility, and strength when used in the absorbent article, examples include polyolefin such as polyethylene (PE) and polypropylene (PP); polyester such as polyethylene terephthalate (PET), polytrimethylene terephthalate (PTT), and polyethylene naphthalate (PEN); polyamide such as nylon; rayon; other synthetic resins or synthetic fibers; and fibers such as cotton, silk, hemp, and pulp (cellulose). As the constituent material, from the viewpoint of increasing strength of the liquid permeable top sheet 30, synthetic fibers are preferably used, and among these, polyolefin and polyester are preferable. These materials may be used alone, or two or more materials may be used in combination.

It is desirable that a non-woven fabric used for the liquid permeable top sheet 30 have appropriate hydrophilicity from the viewpoint of improving liquid absorption performances of the absorbent article. From this viewpoint, one having the hydrophilicity of 5 to 200 is preferable, and one having the hydrophilicity of 10 to 150 is more preferable, where the hydrophilicity is measured according to "Hydrophilicity of Non-Woven Fabric" (in accordance with Pulp and Paper Test Method No. 68 (2000)) disclosed in PCT International Publication No. WO2011/086843. Among the above-mentioned non-woven fabrics, a non-woven fabric having such a hydrophilicity may be formed using one, such as rayon fibers, which shows an appropriate hydrophilicity by itself; or may be formed using one obtained by hydrophilizing hydrophobic chemical fibers such as polyolefin fibers and polyester fibers by a known method to impart an appropriate hydrophilicity.

Examples of the method of hydrophilizing chemical fibers include a method of obtaining a non-woven fabric by a spunbond technique using one obtained by mixing a hydrophilizing agent to hydrophobic chemical fibers in a spunbond non-woven fabric, a method of using a hydrophilizing agent when producing a spunbond non-woven fabric with hydrophobic chemical fibers, and a method of obtaining a spunbond non-woven fabric with hydrophobic chemical fibers, and thereafter impregnating with a hydrophilizing agent. As the hydrophilizing agent, anionic surfactants such as aliphatic sulfonic acid salts and higher alcohol sulfuric acid ester salts; cationic surfactants such as quaternary ammonium salts; nonionic surfactants such as polyethylene glycol fatty acid esters, polyglycerin fatty acid esters, and sorbitan fatty acid esters; silicone surfactants such as polyoxyalkylene-modified silicone; stain release agents formed of polyester-based, polyamide-based, acrylic-based, or urethane-based resin; and the like are used.

It is preferable that a non-woven fabric used for the liquid permeable top sheet 30 is moderately bulky and has a large fabric weight per unit area from the viewpoint of imparting favorable liquid permeability, flexibility, strength, and cushioning properties to the absorbent article, and accelerating a liquid permeation rate of the absorbent article. The fabric weight per unit area of the non-woven fabric is preferably 5 to 200 $g/m^2$, more preferably 8 to 150 $g/m^2$, and further more preferably 10 to 100 $g/m^2$. Furthermore, the thickness of the non-woven fabric is preferably 20 to 1400 μm, more preferably 50 to 1200 μm, and further more preferably 80 to 1000 μm.

The liquid impermeable back sheet 40 prevents a liquid absorbed by the absorber 10 from leaking to the outside from the back sheet 40 side. For the liquid impermeable back sheet 40, it is possible to use liquid impermeable films mainly composed of polyolefin resins such as polyethylene (PE) and polypropylene (PP); breathable resin films; composite films in which a breathable resin film is bonded to a non-woven fabric such as a spunbond non-woven fabric and a spunlace non-woven fabric; spunbond/melt-blown/spunbond (SMS) non-woven fabrics in which a water-resistant melt blown non-woven fabric is sandwiched between high-strength spunbond non-woven fabrics; and the like. For the back sheet 40, it is possible to use a resin film having the fabric weight per unit area of 10 to 50 $g/m^2$ and mainly made of low-density polyethylene (LDPE) resin from the viewpoint of ensuring flexibility so as not to impair a sense of wearing the absorbent article. Furthermore, in a case where a breathable material is used, dampness generated at the time of wearing is reduced, and thereby discomfort to a wearer can also be reduced.

The magnitude relationship between the absorber 10, the core wraps 20a and 20b, the liquid permeable top sheet 30, and the liquid impermeable back sheet 40 is not particularly limited, and is appropriately adjusted according to the use of the absorbent article or the like. In addition, the method of retaining the shape of the absorber 10 using the core wraps 20a and 20b is not particularly limited, and as shown in FIG. 1, the absorber may be sandwiched by a plurality of core wraps, and the absorber may be covered by one core wrap.

The absorber 10 may be adhered to the liquid permeable top sheet 30. By adhering the absorber 10 and the liquid permeable top sheet 30, a liquid is more smoothly guided to the absorber, and thereby the absorbent article further better in preventing liquid leakage is easily obtained. In a case where the absorber 10 is sandwiched or covered by the core wrap, it is preferable that at least the core wrap and the liquid permeable top sheet 30 are adhered to each other, and it is more preferable that the core wrap and the absorber 10 are further adhered to each other. Examples of a method of adhering include a method of adhering by applying a hot melt adhesive to the liquid permeable top sheet 30 in a width direction thereof at predetermined intervals in a shape such as a longitudinal direction striped shape and a spiral shape; and a method of adhering using a water-soluble binder selected from starch, carboxymethyl cellulose, polyvinyl alcohol, polyvinylpyrrolidone, and other water-soluble polymers. In addition, in a case where the absorber 10 contains thermal bonding synthetic fibers, a method of adhering by thermal bonding thereof may be adopted.

A method for producing water-absorbent resin particles of the present embodiment may include selecting water-absorbent resin particles based on the gel brightness L* measured by the above-mentioned method. Specifically, selecting may be, for example, selecting water-absorbent resin particles in which the gel brightness L* is 8 to 60. Examples of the selecting include selecting water-absorbent resin particles satisfying a suitable gel brightness L* by collecting in-process products at any stage in the production process. The above-mentioned production method may include a step of measuring the gel brightness L* of the water-absorbent resin particles. As properties of the water-absorbent resin particles to be selecting, those satisfying the above-described aspects of the water-absorbent resin particles (for example, a physiological saline retention amount in a specific range, a 5-minute value of non-pressurization DW in a specific range, and the like) may be selected.

One aspect of the present embodiment can also be said to be a method for improving an absorption amount of an absorber, the method including adjusting a gel brightness L* of water-absorbent resin particles measured by the above-described method. More specific measurement method of the gel brightness L* will be described in Examples to be described later. The method for improving the absorption amount of the absorber may further include, for example, adjusting the gel brightness L* of the water-absorbent resin particles to the range of 8 to 60, adjusting the physiological saline retention amount of the water-absorbent resin particles to 30 to 60 g/g, and adjusting the 5-minute value of non-pressurization DW of the water-absorbent resin particles to 30 ml/g or more. A specific example of the method for producing the water-absorbent resin particles having these predetermined properties is as described above. Adjusting the gel brightness L* of the water-absorbent resin particles to the range of 8 to 60 can be performed by, for example, selecting production conditions for the water-absorbent resin particles so that each particle of the water-absorbent resin particles is uniformly crosslinked, and the uniformity of crosslinking in the particles is further improved.

According to the present embodiment, it is possible to provide a method for producing an absorber by using the water-absorbent resin particles obtained by the above-mentioned method for producing water-absorbent resin particles. The method for producing an absorber of the present embodiment includes a particle producing step of obtaining water-absorbent resin particles by the above-mentioned method for producing water-absorbent resin particles. The method for producing an absorber of the present embodiment may include a step of mixing the water-absorbent resin particles and a fibrous substance after the particle producing step. According to the present embodiment, it is possible to provide a method for producing an absorbent article by using the absorber obtained by the above-mentioned method for producing an absorber. The method for producing an absorbent article of the present embodiment includes an absorber producing step of obtaining an absorber by the above-mentioned method for producing an absorber. The method for producing an absorbent article of the present embodiment may include a step of obtaining an absorbent article by using the absorber and other constituent member for an absorbent article after the absorber producing step, and in this step, for example, an absorbent article is obtained by laminating the absorber and other constituent member for an absorbent article with each other.

EXAMPLES

Hereinafter, contents of the present invention will be described in further detail using examples and comparative examples, but the present invention is not limited to the following examples.

<Production of Water-Absorbent Resin Particles>

Example 1

Figure 2:
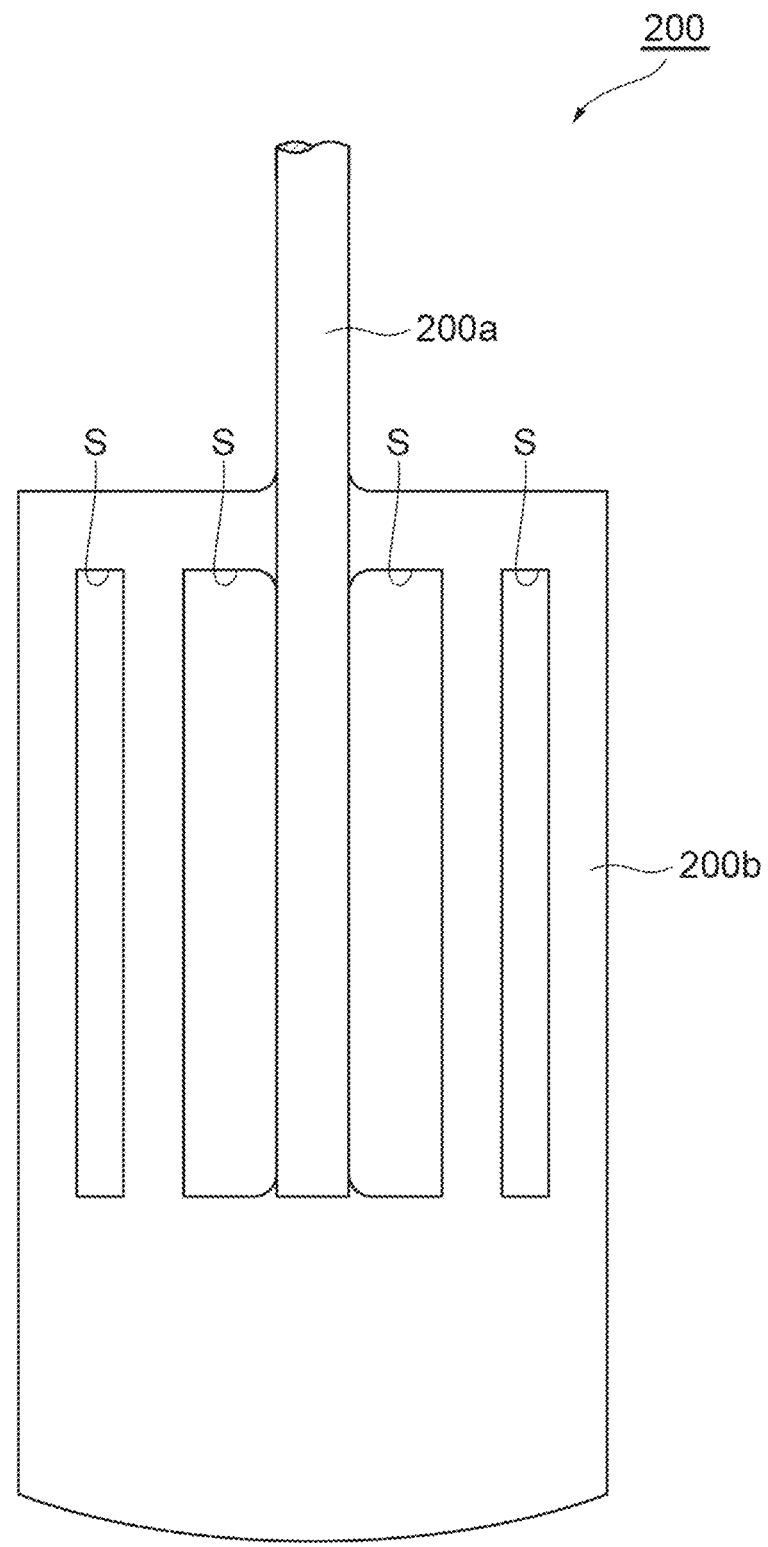
FIG. 2 is a plan view showing an outline of a stirring blade (flat plate blade having slits on a flat plate portion).

A round-bottomed cylindrical separable flask with the inner diameter of 11 cm and the internal volume of 2 L equipped with a reflux cooling device, a dropping funnel, a nitrogen gas introduction tube, and a stirrer was prepared. The stirrer was equipped with a stirring blade (flat plate blade) 200 of which an outline is shown in FIG. 2. The stirring blade 200 includes a shaft 200a and a flat plate portion 200b. The flat plate portion 200b is welded to the shaft 200a and has a curved distal end. Four slits S extending along an axial direction of the shaft 200a are formed in the flat plate portion 200b. The four slits S are arranged in a width direction of the flat plate portion 200b, where the width of the two slits S at the inner side is 1 cm, and the width of the two slits S at the outer side is 0.5 cm. The length of the flat plate portion 200b is about 10 cm, and the width of the flat plate portion 200b is about 6 cm. In the prepared separable flask, 293 g of n-heptane, and 0.736 g of a maleic anhydride-modified ethylene-propylene copolymer (manufactured by Mitsui Chemicals, Inc., Hi-Wax 1105A) as a dispersant were mixed. The dispersant was dissolved in n-heptane by raising the temperature to 80° C. while stirring the mixture in the separable flask with the stirrer. The formed solution was cooled to 50° C.

Meanwhile, 92.0 g (1.03 mol) of an aqueous solution of 80.5% by mass acrylic acid was put into a beaker having the internal volume of 300 mL as a water-soluble ethylenically unsaturated monomer, and while cooling from the outside, 147.7 g of an aqueous solution of 20.9% by mass sodium hydroxide was added dropwise into the beaker to perform 75 mol % of neutralization. Thereafter, 0.092 g of hydroxyethyl cellulose (Sumitomo Seika Chemicals Co., Ltd., HEC AW-15F) as a thickener, 0.0648 g (0.272 mmol) of sodium persulfate as a water-soluble radical polymerization agent, and 0.010 g (0.057 mmol) of ethylene glycol diglycidyl ether as an internal crosslinking agent were added and dissolved to prepare a first stage aqueous liquid.

The first stage aqueous liquid was added into the above-mentioned separable flask, and stirring was performed for 10 minutes. Thereafter, a surfactant solution obtained by heat-dissolving 0.736 g of sucrose stearic acid ester (Mitsubishi-Chemical Foods Corporation, Ryoto Sugar Ester S-370, HLB: 3) as a surfactant in 6.62 g of n-heptane was added into the above-mentioned separable flask, and the inside of the system was sufficiently replaced with nitrogen while stirring at the rotation speed of 425 rpm of the stirrer. Thereafter, the above-mentioned separable flask was immersed in a water bath at 70° C. to raise the temperature, and polymerization was performed for 60 minutes to obtain a first stage polymerization slurry solution.

128.8 g (1.44 mol) of an aqueous solution of 80.5% by mass acrylic acid was put into another beaker having the internal volume of 500 mL as a water-soluble ethylenically unsaturated monomer, and while cooling from the outside, 159.0 g of an aqueous solution of 27% by mass sodium hydroxide was added dropwise to perform 75 mol % of neutralization. In the beaker after the neutralization, 0.0907 g (0.381 mmol) of sodium persulfate as a water-soluble radical polymerization initiator and 0.0116 g (0.067 mmol) of ethylene glycol diglycidyl ether as an internal crosslinking agent were added and dissolved to prepare a second stage aqueous liquid.

While stirring at the rotation speed of 650 rpm of the stirrer, the inside of the above-mentioned separable flask system was cooled to 25° C., and then the total amount of the above-mentioned second stage aqueous liquid was added to the first stage polymerization slurry solution. After replacing the inside of the separable flask system with nitrogen for 30 minutes, the separable flask was immersed in a water bath at 70° C. again to raise the temperature, and the polymerization reaction was performed for 60 minutes to obtain a hydrogel-like polymer.

To the hydrogel-like polymer after the second stage polymerization, 0.589 g of an aqueous solution of 45% by mass diethylenetriamine pentaacetic acid pentasodium was added under stirring. Thereafter, the above-mentioned separable flask was immersed in an oil bath set at 125° C., and 262.7 g of water was extracted to the outside of the system while refluxing n-heptane by azeotropic distillation of n-heptane and water. Thereafter, 4.42 g (0.507 mmol) of an aqueous solution of 2% by mass ethylene glycol diglycidyl ether was added into the above-mentioned separable flask as a surface crosslinking agent, and the mixture was maintained at 83° C. for 2 hours.

Thereafter, drying was performed by evaporating n-heptane at 125° C. to obtain polymer particles (dried product). These polymer particles were passed through a sieve having the opening of 850 μm, 0.5% by mass of amorphous silica (Oriental Silicas Corporation, Tokusil NP-S) with respect to the mass of the polymer particles was mixed with the polymer particles to obtain 222.0 g of water-absorbent resin particles containing amorphous silica. The median particle diameter of the water-absorbent resin particles was 372 μm, and the pure water absorption amount was 568 g/g.

Example 2

229.0 g of water-absorbent resin particles were obtained in the same manner as that in Example 1, except that, the amount of water extracted to the outside of the system by azeotropic distillation was changed to 271.0 g, and the amount of amorphous silica mixed with the polymer particles was changed to 0.2% by mass with respect to the mass of the polymer particles. The median particle diameter of the water-absorbent resin particles was 360 μm, and the pure water absorption amount was 684 g/g.

Example 3

231.2 g of water-absorbent resin particles were obtained in the same manner as that in Example 1, except that, in preparation of a first stage polymerization slurry solution, the rotation speed of the stirrer at the time of nitrogen replacement was changed to 350 rpm; the amount of water extracted to the outside of the system by azeotropic distillation was changed to 257.2 g; and the amount of amorphous silica mixed with the polymer particles was changed to 0.2% by mass with respect to the mass of the polymer particles. The median particle diameter of the water-absorbent resin particles was 359 μm, and the pure water absorption amount was 452 g/g.

Example 4

231.1 g of water-absorbent resin particles were obtained in the same manner as that in Example 1, except that, in preparation of a first stage aqueous liquid, the addition amount of ethylene glycol diglycidyl ether as an internal crosslinking agent was changed to 0.0156 g (0.090 mmol); in preparation of a first stage polymerization slurry solution, the rotation speed of the stirrer at the time of nitrogen replacement was changed to 350 rpm; in preparation of a second stage aqueous liquid, the addition amount of ethylene glycol diglycidyl ether as an internal crosslinking agent was changed to 0.0129 g (0.074 mmol); the amount of water extracted to the outside of the system by azeotropic distillation was changed to 254.5 g; and the amount of amorphous silica mixed with the polymer particles was changed to 0.2% by mass with respect to the mass of the polymer particles. The median particle diameter of the water-absorbent resin particles was 370 μm, and the pure water absorption amount was 334 g/g.

Comparative Example 1

229.0 g of water-absorbent resin particles was obtained in the same manner as in Example 1 except that, a stirring blade was changed to one having two stages of four inclined paddle blades with the blade diameter of 5 cm; in preparation of a first stage aqueous liquid, a radical polymerization initiator used was changed to 0.092 g (0.339 mmol) of 2,2'-azobis(2-amidinopropane) dihydrochloride and 0.018 g (0.068 mmol) of potassium persulfate, and the addition amount of ethylene glycol diglycidyl ether as an internal crosslinking agent was changed to 0.0046 g (0.026 mmol); in preparation of a first stage polymerization slurry solution, the rotation speed of the stirrer at the time of nitrogen replacement was changed to 550 rpm; in preparation of a second stage aqueous liquid, a radical polymerization initiator used was changed to 0.129 g (0.475 mmol) of 2,2'-azobis(2-amidinopropane) dihydrochloride and 0.026 g (0.095 mmol) of potassium persulfate; after the preparation of the second stage aqueous liquid, the rotation speed of the stirrer at the time of cooling the inside of the separable flask system to 25° C. was changed to 1000 rpm; the amount of water extracted to the outside of the system by azeotropic distillation was changed to 216.7 g; and the amount of amorphous silica mixed with the polymer particles was changed to 0.2% by mass with respect to the mass of the polymer particles. The median particle diameter of the water-absorbent resin particles was 348 μm.

Comparative Example 2

231.5 g of water-absorbent resin particles was obtained in the same manner as in Comparative Example 1 except that, after the preparation of the second stage aqueous liquid, the temperature for cooling the inside of the separable flask system was changed to 28° C.; and the amount of water extracted to the outside of the system by azeotropic distillation was changed to 204.7 g. The median particle diameter of the water-absorbent resin particles was 337 μm.

Comparative Example 3

A round-bottomed cylindrical separable flask having four side wall baffles (baffle width: 7 mm), with the inner diameter of 110 mm and the volume of 2 L, equipped with a reflux cooling device, a dropping funnel, a nitrogen gas introduction tube, and a stirrer was prepared. To the stirrer, a stirring blade having two stages of four inclined paddle blades having the blade diameter of 50 mm and surface-treated with a fluororesin was attached. In the prepared separable flask, 660 mL of n-heptane and 0.984 g of sorbitan monolaurate (trade name: Nonion LP-20R, HLB value 8.6, manufactured by NOF CORPORATION) were mixed. The sorbitan monolaurate was dissolved in n-heptane by raising the temperature to 50° C. while stirring the mixture in the separable flask with the stirrer. The formed solution was cooled to 40° C.

92 g of an aqueous solution of 80% by mass acrylic acid (acrylic acid: 1.02 mol) was put into an Erlenmeyer flask having the internal volume of 500 mL. While cooling with ice from the outside, 146 g of an aqueous solution of 21% by mass sodium hydroxide was added dropwise into the aqueous solution of acrylic acid in the flask to neutralize 75 mol % of acrylic acid. Next, 0.101 g (0.374 mmol) of potassium persulfate as a water-soluble radical polymerization initiator was added, and these were dissolved in the aqueous solution to prepare a monomer aqueous solution.

The obtained monomer aqueous solution was added into the above-mentioned separable flask to which the solution containing sorbitan monolaurate was put, and the inside of the system was sufficiently replaced with nitrogen. While stirring at the rotation speed of 700 rpm of the stirrer, the reaction solution in the separable flask was maintained for 60 minutes in a warm water bath at 70° C. to cause the polymerization reaction to proceed.

A dispersion liquid in which 0.092 g of amorphous silica (manufactured by Evonik Degussa Japan Co., Ltd., CARPLEX #80) was dispersed in 100 g of n-heptane was prepared. The dispersion liquid was added to the reaction solution containing the hydrogel-like polymer generated by the polymerization reaction, and the reaction solution was stirred for 10 minutes. The separable flask was immersed in an oil bath at 125° C., and 104 g of water was extracted to the outside of the system by azeotropic distillation. Thereafter, 8.28 g of an aqueous solution of 2% by mass ethylene glycol diglycidyl ether (ethylene glycol diglycidyl ether: 0.95 mmol) was added as a surface crosslinking agent, and the internal temperature was maintained at 80° C.±2° C. for 2 hours to cause the surface crosslinking reaction to proceed.

n-Heptane was evaporated by heating the reaction solution to 125° C. to obtain a dried product of polymer particles. This dried product was passed through a sieve having the opening of 850 μm to obtain 90.5 g of water-absorbent resin particles. The median particle diameter of the water-absorbent resin particles was 420 μm.

The obtained water-absorbent resin particles were evaluated for the 5-minute value of non-pressurization DW, gel brightness L*, dried particle brightness L*, physiological saline retention amount, median particle diameter, and absorber swelling capacity by the following method. The physiological saline used in the present example is an aqueous solution of 0.9% by mass NaCl.

<Measurement of Non-Pressurization DW>

Figure 4:
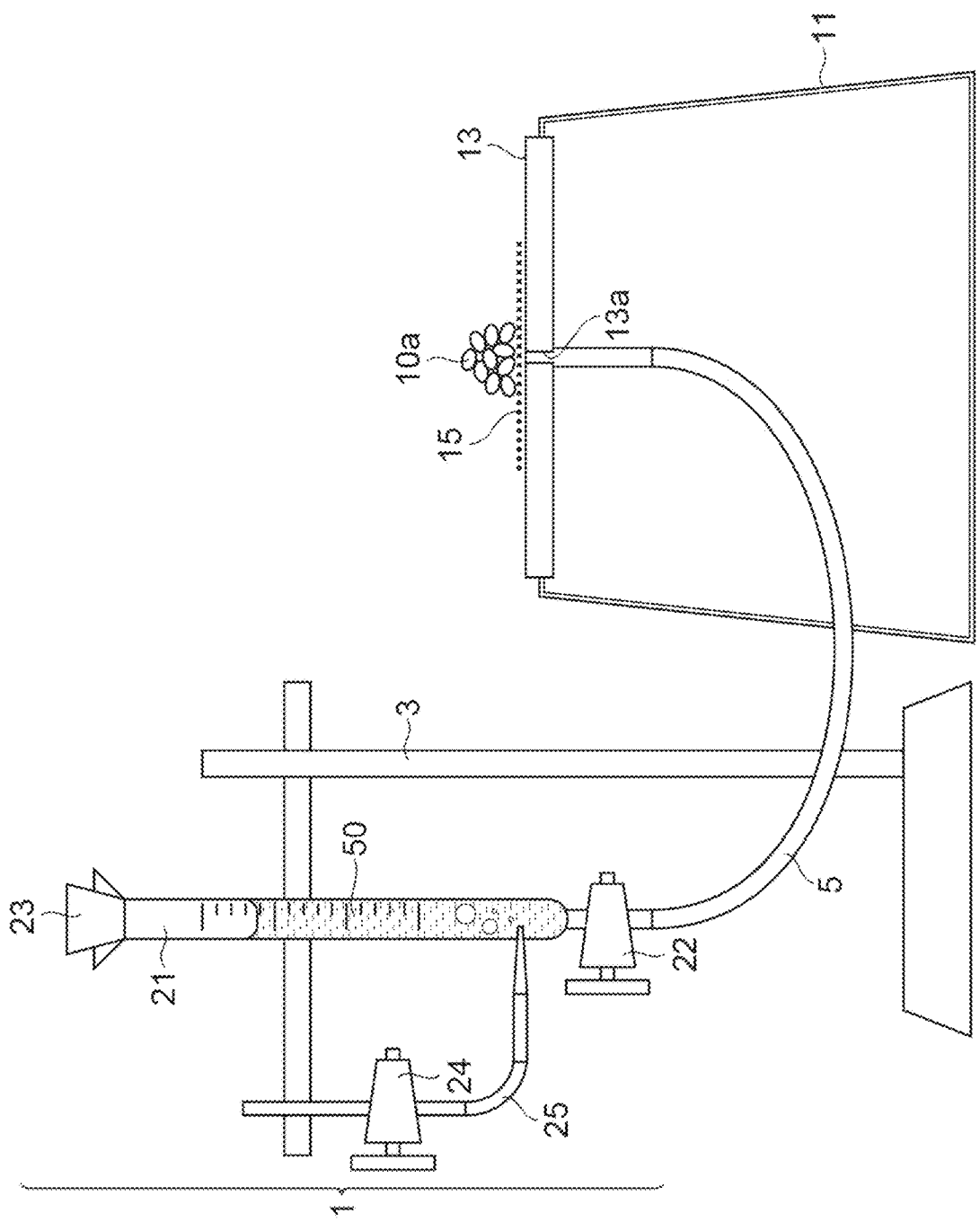
FIG. 4 is a schematic view showing a method for measuring non-pressurization DW.

The non-pressurization DW of the particles of water-absorbent resin was measured using a measurement device shown in FIG. 4. The measurement was performed five times for one type of water-absorbent resin particles, and an average value of three measurement values excluding a minimum value and a maximum value was obtained.

The measurement device has a burette unit 1, a conduit 5, a measurement table 13, a nylon mesh sheet 15, a stand 11, and a clamp 3. The burette unit 1 has a burette tube 21 on which a scale is engraved, a rubber stopper 23 for sealing the opening at the upper part of the burette tube 21, a cock 22 connected to the distal end of the lower part of the burette tube 21, an air introduction tube 25 connected to the lower part of the burette tube 21, and a cock 24. The burette unit 1 is fixed by the clamp 3. The flat plate-shaped measurement table 13 has a through hole 13a having the diameter of 2 mm and formed in the central portion thereof, and is supported by the height-variable stand 11. The through hole 13a of the measurement table 13, and the cock 22 of the burette unit 1 are connected by the conduit 5. The inner diameter of the conduit 5 is 6 mm.

The measurement was performed in the environment of the temperature of 25° C.±2° C. and the humidity of 50%±10%. First, the cock 22 and the cock 24 of the burette unit 1 were closed, and physiological saline (0.9% by mass saline) 50 adjusted to 25° C. was put into the burette tube 21 from the opening at the upper part of the burette tube 21. The concentration 0.9% by mass of the saline is a concentration based on the mass of the saline. The opening of the burette tube 21 was sealed with the rubber stopper 23, and then the cock 22 and the cock 24 were opened. The inside of the conduit 5 was filled with the physiological saline 50 to prevent air bubbles from entering. The height of the measurement table 13 was adjusted so that the height of the water surface of the physiological saline reached the inside of the through hole 13a was the same as the height of the upper surface of the measurement table 13. After the adjustment, the height of the water surface of the physiological saline 50 in the burette tube 21 was read by the scale on the burette tube 21, and this position was defined as a zero point (value read at 0 seconds).

The nylon mesh sheet 15 (100 mm×100 mm, 250 mesh, thickness about 50 μm) was laid in the vicinity of the through hole 13a on the measurement table 13, and a cylinder having the inner diameter of 30 mm and the height of 20 mm was placed on the central portion thereof. 1.00 g of water-absorbent resin particles 10a were uniformly scattered in this cylinder. Thereafter, the cylinder was carefully removed to obtain a sample in which the water-absorbent resin particles 10a were dispersed in a circle shape in the central portion of the nylon mesh sheet 15. Then, the nylon mesh sheet 15 on which the water-absorbent resin particles 10a were placed was moved at a high speed to the extent that the water-absorbent resin particles 10a did not dissipate so that the center of the nylon mesh sheet was at the position of the through hole 13a, and the measurement was started. The timing when air bubbles were first introduced from the air introduction tube 25 into the burette tube 21 was defined as the start of water absorption (0 seconds).

The amount of reduction in the physiological saline 50 in the burette tube 21 (that is, the amount of the physiological saline absorbed by the water-absorbent resin particles 10a) was sequentially read by units of 0.1 mL, and the amount of reduction Wa (g) of the physiological saline 50 was read after 5 minutes from the start of water absorption by the water-absorbent resin particles 10a. A 5-minute value of non-pressurization DW was obtained from Wa by the following formula. The non-pressurization DW is a water absorption amount per 1.00 g of the water-absorbent resin particles 10a.

Value of non-pressurization DW (mL/g)=$Wa/1.00$

<Evaluation of Gel Brightness>

Figure 3:
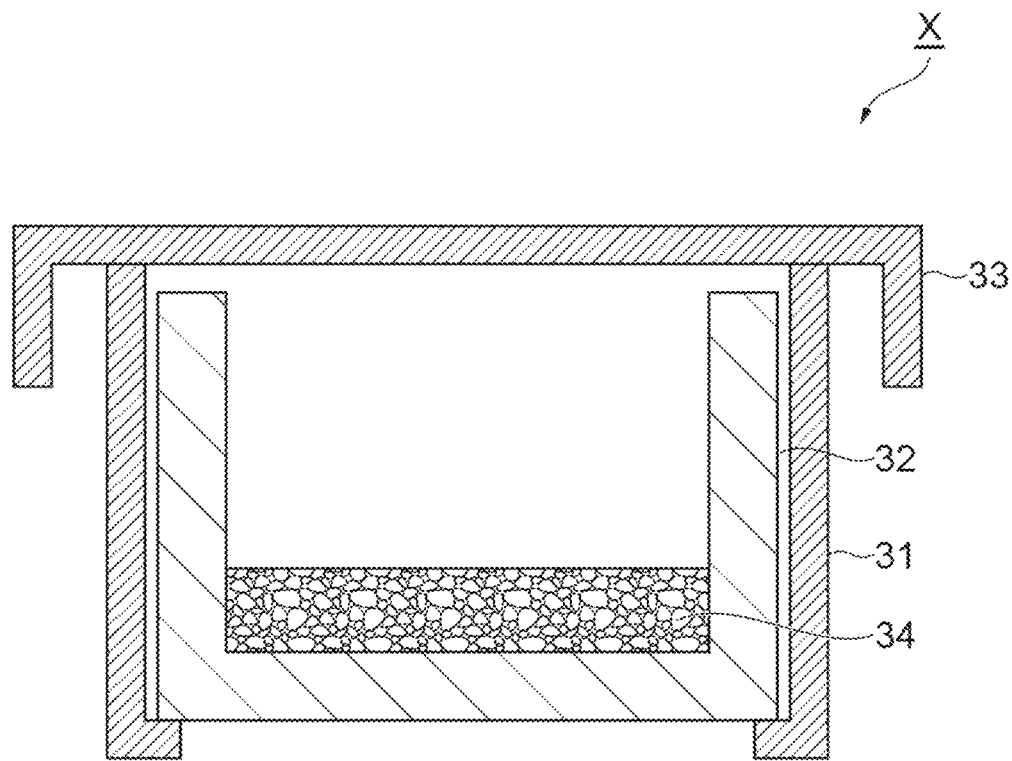
FIG. 3 is a view showing an outline of a gel brightness measurement method.
Figure 5:
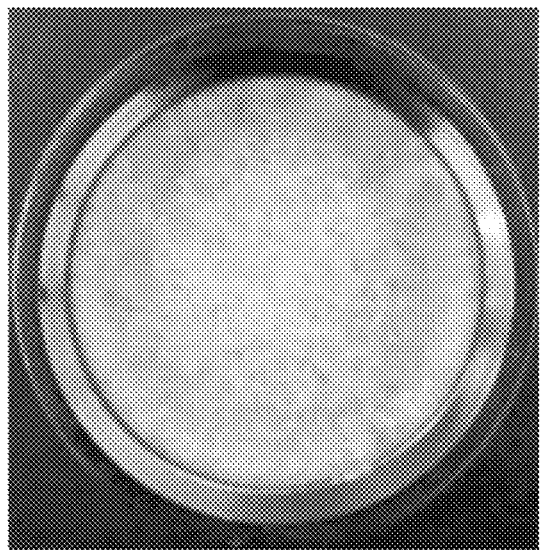
FIG. 5($a$) is a photograph showing a gel of Example 1, and FIG. 5($b$) is a photograph showing a gel of Comparative Example 3.
Figure 5:
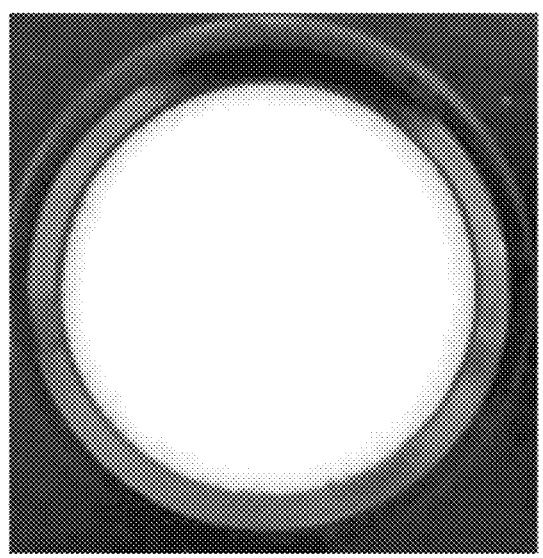

Measurement of the gel brightness was performed using a color-difference meter (ZE 6000, manufactured by NIPPON DENSHOKU INDUSTRIES Co., Ltd.). The measurement was performed in the environment of the temperature of 25° C.±2° C. and the humidity of 50%±10%. FIG. 3 is a schematic cross-sectional view of an instrument X used for the gel brightness measurement. First, a colorless and transparent round cell 32 for a color-difference meter having the inner diameter of 30 mm and the height of 13 mm and made of optical glass (Pyrex) was put in a tubular instrument 31. 0.1 g of water-absorbent resin particles were uniformly scattered in the round cell 32, 5.0 g of ion-exchanged water was quickly added using a pipette, and it was closed by a lid 33. The tubular instrument 31 and the lid 33 are black. The water-absorbent resin particles were swollen by being left to stand for 5 minutes after the addition of ion-exchanged water to obtain a gel 34 for measurement. Zero calibration of the color-difference meter, and standard calibration by a standard white plate were performed, and after setting the instrument X containing the gel 34 on the color-difference meter, the brightness L* was measured three times in reflection measurement mode to obtain an average value. The results are shown in Table 1. In all of the examples and the comparative examples, the total amount of the added ion-exchanged water was absorbed by the water-absorbent resin particles, and clumps (unswollen small mass) of the water-absorbent resin particles were not generated. When measurement was performed in the same manner in a state where nothing was put in the round cell 32, the brightness L* was 7.7. FIGS. 5(a) and 5(b) respectively show an optical photograph of the gel for brightness measurement of the water-absorbent resin particles obtained in Example 1 and Comparative Example 3. The photographs of FIGS. 5(a) and 5(b) are photographs of the round cell 32 containing the gel 34 which are taken from below on a black background.

<Evaluation of Dried Particle Brightness>

The brightness L* of the water-absorbent resin particles in a dry state was measured in the same manner as in the above-mentioned evaluation of the gel brightness except that 2.0 g of water-absorbent resin particles in a dry state were uniformly scattered in the round cell 32, and ion-exchanged water was not added. The brightness L* of the water-absorbent resin particles was in the range of 91 to 96 in all of the examples and the comparative examples.

<Measurement of Median Particle Diameter>

In the environment of the temperature of 25° C.±2° C. and the humidity of 50%±10%, the above-mentioned median particle diameter of the water-absorbent resin particles was measured by the following procedure. That is, JIS standard sieves were combined in the following order from the top: a sieve having the opening of 600 μm, a sieve having the opening of 500 μm, a sieve having the opening of 425 μm, a sieve having the opening of 300 μm, a sieve having the opening of 250 μm, a sieve having the opening of 180 μm, a sieve having the opening of 150 μm, and a tray. 50 g of the water-absorbent resin particles was put in the topmost sieve among the combined sieves, and classification was performed using a Ro-tap shaker (manufactured by Iida-seisakusho Japan Corporation) according to JIS Z 8815 (1994). After the classification, the mass of the particles remaining on each of the sieves was calculated as a mass percentage with respect to the total amount to determine a particle size distribution. The relationship between the opening of the sieve and the integrated value of the mass percentage of the particles remaining on the sieve was plotted on a logarithmic probability paper by integrating in the order from the one having the largest particle diameter on the sieve with respect to this particle size distribution. By connecting the plots on the probability paper with a straight line, the particle diameter corresponding to the cumulative mass percentage of 50% by mass was obtained as the median particle diameter.

<Measurement of Physiological Saline Retention Amount>

The physiological saline retention amount (room temperature, 25° C.±2° C.) of the water-absorbent resin particles was measured by the following procedure. First, a cotton bag (cotton broadcloth No. 60, 100 mm in width×200 mm in length) into which 2.0 g of the water-absorbent resin particles had been weighed was placed in a beaker having the internal volume of 500 mL. After pouring 500 g of an aqueous solution of 0.9% by mass sodium chloride (physiological saline) into the cotton bag containing the water-absorbent resin particles at one time so that lumps could not be produced, the upper part of the cotton bag was bound with a rubber band and the cotton bag was left to stand for 30 minutes to swell the water-absorbent resin particles. The cotton bag after an elapse of 30 minutes was dehydrated for 1 minute using a dehydrator (manufactured by KOKUSAN Co., Ltd., product number: H-122) which had been set to have the centrifugal force of 167 G, and then the mass Wb [g] of the cotton bag containing the swollen gel after dehydration was measured. The same operation was performed without addition of the water-absorbent resin particles, the empty mass Wc [g] at the time when the cotton bag was wet was measured, and the physiological saline retention amount of the water-absorbent resin particles was calculated from the following formula. The results are shown in Table 1.

Water retention amount $[g/g] = (Wb - Wc)/2.0$

<Measurement of Pure Water Absorption Amount>

The pure water absorption amount (room temperature, 25° C.±2° C.) of the water-absorbent resin particles was measured by the following procedure. 1000 g of ion-exchanged water was weighed in a beaker having the volume of 2 L, and 0.5 g of water-absorbent resin particles were added while stirring with a spatula so that lumps were not generated. After continuing stirring for 20 seconds, the mixture was left to stand for 30 minutes in a static state to sufficiently swell the water-absorbent resin particles. Thereafter, the content of the above-mentioned beaker was filtered using a JIS standard sieve with the opening of 75 μm, and the sieve was left to stand for 30 minutes in an inclined state with an inclination angle of about 30 degrees with respect to the horizontal to filter excess water. The mass Wd (g) of the standard sieve with the opening of 75 μm alone was previously measured. The mass We (g) of the sieve to which the water-absorbed gel was put was measured, and the pure water absorption amount was obtained by the following formula.

Pure water absorption amount $(g/g) = [We - Wd]\ (g) /$ mass of water-absorbent resin particles (g)

<Evaluation of Absorber Performance>

(Production of Article for Evaluation)

10 g of the water-absorbent resin particles and 10 g of pulverized pulp were uniformly mixed by air papermaking using an air flow type mixer (Padformer manufactured by O-tec Co., Ltd.), and thereby a sheet shaped absorber having the size of 40 cm×12 cm was produced. Subsequently, the absorber was disposed on a core wrap (tissue paper) having the same size as that of the absorber and having the basis weight of 16 g/m², and then a core wrap (tissue paper) having the same size as that of the absorber and having the basis weight of 16 g/m² was disposed on the upper surface of the absorber. A laminate was obtained by applying the load of 141 kPa to the absorber sandwiched by the core wraps for 30 seconds. An SMMS non-woven fabric having the size of 32.5 cm×45.0 cm (basis weight of 13 g/m²) was folded to the size of 45 cm×16.25 cm, and thereafter, the above-mentioned laminate was wrapped with the non-woven fabric. Three open sides of the non-woven fabric wrapping the laminate were crimped by a heat sealer (Fuji Impulse Sealer, model number: FI-450-5 type, manufactured by FUJI IMPULSE CO., LTD.) to seal the laminate. Thus, an article for evaluation was obtained.

(Measurement of Absorber Swelling Capacity)

Measurement was performed in the environment of the temperature of 25° C.±2° C. and the humidity of 50%±10%. A wire mesh (opening size: 20 mm×20 mm, wire diameter 3 mm) and 20 L of physiological saline were put in a bat, and the liquid temperature was adjusted to 25.0° C.±0.2° C. Next, the article for evaluation was widely disposed on the wire mesh and immersed in the aqueous solution of physiological saline for 10 minutes. Thereafter, the wire mesh was lifted together with the article for evaluation, draining was performed for 5 minutes, and then the mass of the article for evaluation was measured. The absorber swelling capacity (unit: g) is a difference in masses of the article for evaluation before and after the test, and is calculated by the following formula. The larger the absorber swelling capacity, the larger the absorption amount of the absorber.

Absorber swelling capacity=mass (g) of article for evaluation after test−mass (g) of article for evaluation before test

TABLE 1

| | Water retention amount (g/g) | 5-Minute value of non-pressurization DW (mL/g) | Gel brightness L* | Absorber swelling capacity (g) |
|---|---|---|---|---|
| Example 1 | 45 | 65.0 | 43 | 986 |
| Example 2 | 50 | 44.6 | 44 | 974 |
| Example 3 | 40 | 48.6 | 47 | 925 |
| Example 4 | 36 | 47.4 | 58 | 849 |
| Comparative Example 1 | 40 | 47.4 | 62 | 838 |
| Comparative Example 2 | 32 | 38.0 | 72 | 775 |
| Comparative Example 3 | 19 | 41.6 | 91 | 757 |

It was confirmed that the absorber using the water-absorbent resin particles of the examples in which the gel brightness L* was 60 or less showed a sufficiently high absorption amount.

REFERENCE SIGNS LIST

1: burette unit, 3: clamp, 5: conduit, 10: absorber, 10a: water-absorbent resin particle, 10b: fiber layer, 11: stand, 13: measurement table, 13a: through hole, 15: nylon mesh sheet, 20a, 20b: core wrap, 21: burette tube, 22: cock, 23: rubber stopper, 24: cock, 25: air introduction tube, 30: liquid permeable top sheet, 31: tubular instrument, 32: round cell, 33: lid, 34: gel, 40: liquid impermeable back sheet, 50:

physiological saline, 100: absorbent article, 200: stirring blade, 200a: shaft, 200b: flat plate portion, S: slit, X: instrument.

The invention claimed is:

1. Water-absorbent resin particles having a gel brightness L* of 8 to 44 measured by a method including the following steps (A), (B), and (C) in this order,
    (A) uniformly scattering 0.1 g of water-absorbent resin particles in a colorless and transparent round cell for a color-difference meter, the round cell having an inner diameter of 30 mm,
    (B) adding 5.0 g of ion-exchanged water to the round cell to cause the water-absorbent resin particles to absorb water, and
    (C) measuring a brightness L* of an obtained gel on a black background after five minutes from the addition of the ion-exchanged water, wherein
    the water-absorbent resin particles comprise crosslinked polymer particles having a structural unit derived from an ethylenically unsaturated monomer that is at least one selected from the group consisting of (meth) acrylic acid and salts thereof, 2-(meth) acrylamide-2-methylpropanesulfonic acid and salts thereof, (meth) acrylamide, N, N-dimethyl (meth) acrylamide, 2-hydroxyethyl (meth) acrylate, N,N-diethylaminoethyl (meth) acrylate, N,N-diethylaminopropyl (meth) acrylate, and diethylaminopropyl (meth) acrylamide,
    an amino group in the ethylenically unsaturated monomer may be quaternized,
    a degree of neutralization of the ethylenically unsaturated monomer by an alkaline neutralizing agent is 10 to 100 mol %,
    an amount of the ethylenically unsaturated monomer is 70 to 100 mol % with respect to a total amount of monomer for the water-absorbent resin particles, and
    a carboxyl group or an amino group of the ethylenically unsaturated monomer participates in surface crosslinking of the water-absorbent resin particles.

2. The water-absorbent resin particles according to claim 1, wherein a physiological saline retention amount is 30 to 60 g/g.

3. The water-absorbent resin particles according to claim 1, wherein a 5-minute value of non-pressurization demand wettability is 30 ml/g or more.

4. An absorber comprising the water-absorbent resin particles according to claim 1.

5. An absorbent article comprising the absorber according to claim 4.

6. The absorbent article according to claim 5, which is a diaper.

7. The water-absorbent resin particles according to claim 1, further comprising a plurality of inorganic particles disposed on a surface of the polymer particles.

8. The water-absorbent resin particles according to claim 7, wherein the content of the inorganic particles is 0.05% by mass or more based on the total mass of the polymer particles.

* * * * *